(12) United States Patent
Grant

(10) Patent No.: US 7,490,505 B2
(45) Date of Patent: Feb. 17, 2009

(54) METHODS AND SYSTEMS FOR PREDICTING EMISSIONS

(75) Inventor: John W. Grant, Gardnerville, NV (US)

(73) Assignee: General Electric Company, Schenectady, NY (US)

(*) Notice: Subject to any disclaimer, the term of this patent is extended or adjusted under 35 U.S.C. 154(b) by 42 days.

(21) Appl. No.: 11/504,461

(22) Filed: Aug. 15, 2006

(65) Prior Publication Data

US 2008/0046126 A1 Feb. 21, 2008

(51) Int. Cl.
G01M 19/00 (2006.01)

(52) U.S. Cl. .................................. 73/23.31

(58) Field of Classification Search ............... 73/23.31, 73/114.69, 114.71, 114.73, 114.75
See application file for complete search history.

(56) References Cited

U.S. PATENT DOCUMENTS

2006/0045801 A1* 3/2006 Boyden et al. ............... 422/62

* cited by examiner

Primary Examiner—Eric S McCall
(74) Attorney, Agent, or Firm—Mark E. Henderson; Ernest G. Cusick; Frank A. Landgraff

(57) ABSTRACT

A method of predicting emissions that may include the steps of: determining a first capacity for emissions during a sliding window of time; determining a used capacity for emissions during the sliding window of time; and determining an available capacity for emissions by calculating the differential between the first capacity and the used capacity. The emission violation may be an opacity emission violation. The first capacity may be the average opacity level available to a fossil fuel fired power plant over the sliding window of time before the opacity emission violation occurs.

18 Claims, 3 Drawing Sheets

METHODS AND SYSTEMS FOR PREDICTING EMISSIONS

TECHNICAL FIELD

This present application relates generally to methods and systems for predicting emissions. More specifically, but not by way of limitation, the present application relates to methods and systems for predicting when emissions exceed prescribed levels such that emission violations occur. Further, the present application relates to methods and systems for predicting opacity emissions in fossil fuel fired power plants, cement plants and other similar facilities.

BACKGROUND OF THE INVENTION

The opacity emissions of fossil fuel fired power plants, cement plants and similar facilities generally are government regulated. For example, in the United States of America, the Federal Government regulates opacity emissions such that the emissions from a plant may not exceed a certain opacity limit amount over a specified period of time without incurring fines. The manner in which infractions are determined typically includes a calculation of the average opacity over a sliding window of time. If the allowable average opacity measurement over the sliding period of time is exceeded, a violation occurs.

Operators of the fossil fired power plants and cement plants manage and operate the combustion and filter systems that affect the amount of emissions from the plant. However, at present, operators are without the appropriate means for making the determination as to when the emissions of the plant are nearing the opacity emission threshold, i.e., operators do not have any indications of when the plant is nearing an opacity violation. If operators had the means to determine when the emissions of the plant are nearing the relevant threshold or predict when a violation is at risk of occurring, the operator could control plant variables, such as plant combustion rates and filtering systems, to avoid the violation. Thus, there is a need for improved methods and systems for determining or predicting when opacity emission violation will occur.

BRIEF DESCRIPTION OF THE INVENTION

The present application thus describes a method of predicting emissions that may include the steps of: determining a first capacity for emissions during a sliding window of time; determining a used capacity for emissions during the sliding window of time; and determining an available capacity for emissions by calculating the differential between the first capacity and the used capacity. The emissions may be determined at a fossil fuel fired power plant and the predicting emissions may include predicting emission violations. The emission violation may include an opacity emission violation. The first capacity may be the average opacity level available to the fossil fuel fired power plant over the sliding window of time before the opacity emission violation occurs.

The step of determining a used capacity for emissions during the sliding window of time may include taking periodic opacity measurements of the emissions by an opacity sensor. The opacity measurements may be taken at the rate of approximately one every second. The used capacity may include an average of the opacity measurements taken during the sliding window of time.

In some embodiments, the method further may include the steps of: recording the available capacity data; analyzing the recorded available capacity data over time; and determining, from the analysis of the recorded available capacity data, a predicted time to violation that indicates when the available capacity is predicted to equal about 0. The analyzing of the recorded available capacity data may include linear extrapolation. In some embodiments, the analyzing of the recorded available capacity data may include least squares linear extrapolation where the least squares linear extrapolation is based on at least the last five samples of the available capacity data.

In some embodiments, the method further may include the step of comparing the available capacity to one or more predetermined warning levels to determine if the available capacity is at a level that indicates proximity to the emission violation. The method further may include the step of comparing the predicted time to violation to one or more predetermined time to violation warning levels to determine if the time to violation is at a level that indicates proximity to the emission violation.

The method further may include the step of generating an event based on the comparison the available capacity to predetermined warning levels and/or the comparison of predicted time to violation to predetermined time to violation warning criteria. The event may include a warning concerning the proximity to the emission violation. The step of generating an event may occur when at least one of the following conditions is satisfied: when the predicted time to violation is determined to be less than 120 seconds; when the predicted time to violation is determined to be less than 90 seconds; when the predicted time to violation is determined to be less than 60 seconds; when the available capacity is determined to be less than a first predetermined warning level, the first predetermined warning level indicating when the available capacity is less than about 7-10% of the first capacity; when the predicted time to violation is determined to be less than 30 seconds; or when the available capacity is determined to be less than a second predetermined warning level, the second predetermined warning level indicating when the available capacity is less than about 2-5% of the first capacity.

In some embodiments, the step of generating an event further may include sending notification of the event. The step of generating an event further may include sending notification of one or more recommended actions to avoid the emission violation. The recommended actions may be taken automatically.

The present application further describes a system for predicting an emission violation that includes: means for determining a first capacity for emissions during a sliding window of time; means for determining a used capacity for emissions during the sliding window of time; means for determining an available capacity for emissions by calculating the differential between the first capacity and the used capacity; means for recording the available capacity data; means for analyzing the recorded available capacity data over time; and means for determining, from the analysis of the recorded available capacity data, a predicted time to an emission level that indicates when the available capacity is predicted to equal about 0.

In some embodiments, the means for determining a used capacity for emissions during a sliding window of time may include an opacity sensor, and the emission violation may include an opacity emission violation.

In some embodiments, the first capacity may include the average opacity level available to an emitter over the sliding window of time before the opacity emission violation occurs. The used capacity may include an average of periodic opacity measurements taken by the opacity sensor during the sliding window of time. The means for determining a predicted time to an emission level that indicates when the available capacity is predicted to equal about 0 may include means for performing least squares linear extrapolation. The least squares linear extrapolation may be based on at least the last five samples of the available capacity data.

These and other features of the present application will become apparent upon review of the following detailed description of the preferred embodiments when taken in conjunction with the drawings and the appended claims.

DETAILED DESCRIPTION OF THE INVENTION

Figure 1:
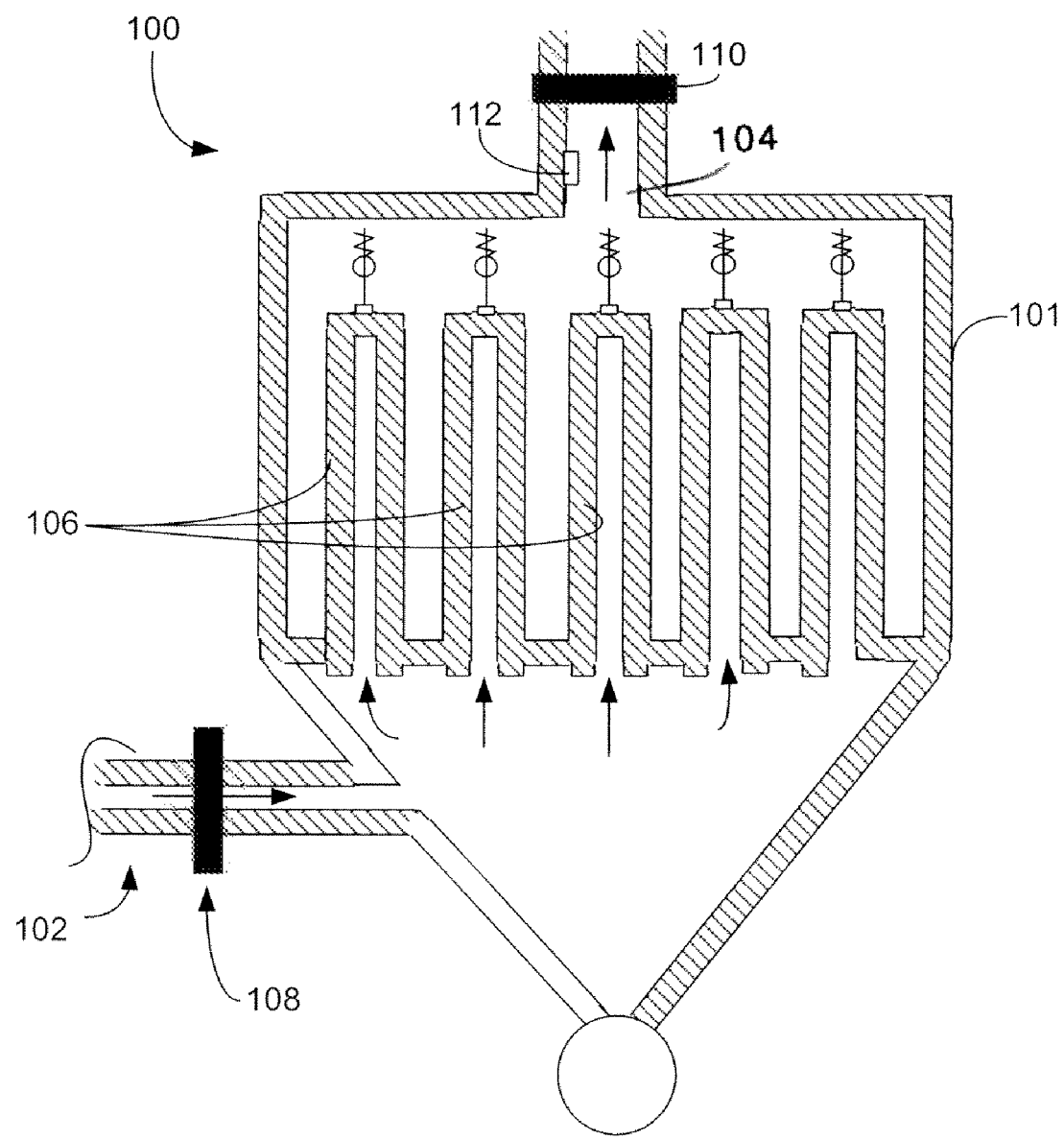
FIG. 1 is a cross-section view of a typical environment, a baghouse filtering system for a fossil fired power plant, in which an exemplary embodiment of the present application may be used.

Referring now to the figures, where the various numbers represent like parts throughout the several views, FIG. 1 demonstrates an exemplary environment, i.e., a baghouse filter system 100 for a fossil fuel fired power plant, in which an embodiment of the present application may be used. Those of ordinary skill in the art will appreciate that embodiments of the present application also may be used in other types of filtering systems and/or plants, such as cement plants and similar facilities. A baghouse filter chamber 101 may be disposed between an inlet flow pipe 102 and an exit flow pipe 104 for a fluid, such as air, which contains pollutants to be filtered out before discharge into the atmosphere. The baghouse filter chamber 101 may contain a plurality of filter bags 106. Arrows indicate the flow of air into the filter bags 106 in which fabric defines elongated bags closed at the top so that the air must flow through the fabric on its path to reach the exit flow pipe 104. In this manner, the air may be filtered by the filter bags 106.

The baghouse filter system 100 may further include an inlet valve 108 and an exit valve 110. The inlet valve 108 also may include sensors, which may report whether the inlet valve 108 is open or closed to an operating system (not shown). The operating system, as discussed in more detail below, may be any commercially available computerized or manual system that are used to control plant operations. The exit valve 110 also may include sensors, which may report to the operating system whether the exit valve 110 is open or closed. As would be appreciated by those skilled in the art, the operating system further may control the operation (i.e., the opening, closing or other settings) of the inlet valve 108, the exit valve 110 and the other mechanical systems of the baghouse filter system 100.

The exit flow pipe 104 further may include an opacity transducer or sensor 112 which may periodically measure the opacity of the discharged air and electronically report the measurement to the operating system. The period in which the opacity sensor 112 measures the opacity of the discharged air may be relatively short. In some embodiments of the present application, the period may be about every second. Note that FIG. 1 demonstrates that the opacity sensor 112 measures opacity for a single baghouse filter chamber, baghouse filter chamber 101. The opacity sensor may be located in a more general exhaust location such that the opacity sensor 112 measures the opacity level of the exhaust from the several baghouse filter chambers or the exhaust of the entire system. The method described herein may operate under either condition or as government regulation may dictate. The opacity sensor 112 may be any commercially available opacity sensor. For example, in some embodiments, an opacity sensor such as Columbia Scientific Model 500C (part number 970-9482) may be used.

Figure 2:
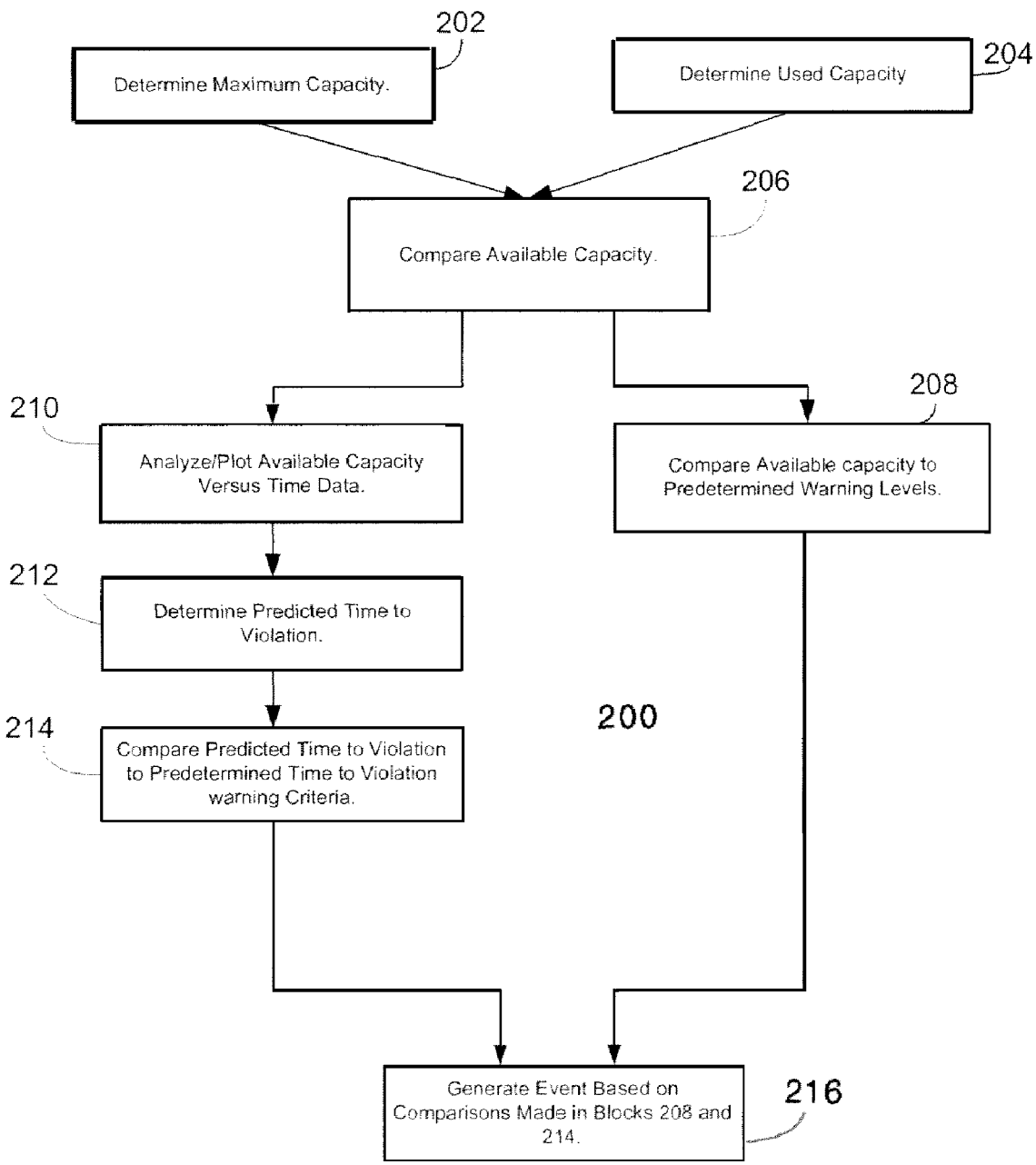
FIG. 2 is a flow diagram demonstrating an exemplary embodiment of the present application.

FIG. 2 demonstrates a logic flow diagram 200 of an exemplary embodiment of the present application and will be discussed in conjunction with FIGS. 3(a) and 3(b), which provide graphs demonstrating the operation of an exemplary embodiment of the present application. The logic flow diagram 200 may be implemented and controlled by the operating system. The operating systems may comprise any appropriate high-powered solid-state switching device. The operating system may be a computer; however, this is merely exemplary of an appropriate high-powered control system, which is within the scope of the application. For example, but not by way of limitation, the operating system may include at least one of a silicon controlled rectifier (SCR), a thyristor, MOS-controlled thyristor (MCT) and an insulated gate bipolar transistor. The operating system also may be implemented as a single special purpose integrated circuit, such as ASIC, having a main or central processor section for overall, system-level control, and separate sections dedicated performing various different specific combinations, functions and other processes under control of the central processor section. It will be appreciated by those skilled in the art that the operating system also may be implemented using a variety of separate dedicated or programmable integrated or other electronic circuits or devices, such as hardwired electronic or logic circuits including discrete element circuits or programmable logic devices, such as PLDs, PALs, PLAs or the like. The operating system also may be implemented using a suitably programmed general-purpose computer, such as a microprocessor or microcontrol, or other processor device, such as a CPU or MPU, either alone or in conjunction with one or more peripheral data and signal processing devices. In general, any device or similar devices on which a finite state machine capable of implementing the logic flow diagram 200 may be used as the operating system. As shown a distributed processing architecture may be preferred for maximum data/signal processing capability and speed.

The flow diagram 200 may begin at a step 202 where the process may determine a Maximum Capacity. The Maximum Capacity may represent the maximum average opacity level available to an emitter, such as a fossil fired power plant or a cement plant, over a sliding window of time 304 before an opacity emission violation occurs, predetermined opacity emission limit is reached, or desired opacity emission level exceeded, which, hereinafter, will be referred to as an "opacity emission violation," though the use of this term "violation" is not intended to be limiting. As used herein, the term "opacity emission violation" is defined to be a condition where the opacity emissions of an emitter during a relevant time frame exceed a desired level. The desired level may reflect any desired level for opacity emissions, which, for example, may include levels that correspond to compliance with a federal regulation or law, a state regulation or law, a corporate policy, or other similar regulation. For example, as represented in FIG. 3(a), an emitter may be allowed to average 10% opacity (see a maximum average opacity line 306) on its emission over the sliding window of time 304 without incurring an opacity emission violation.

Figure 3A:
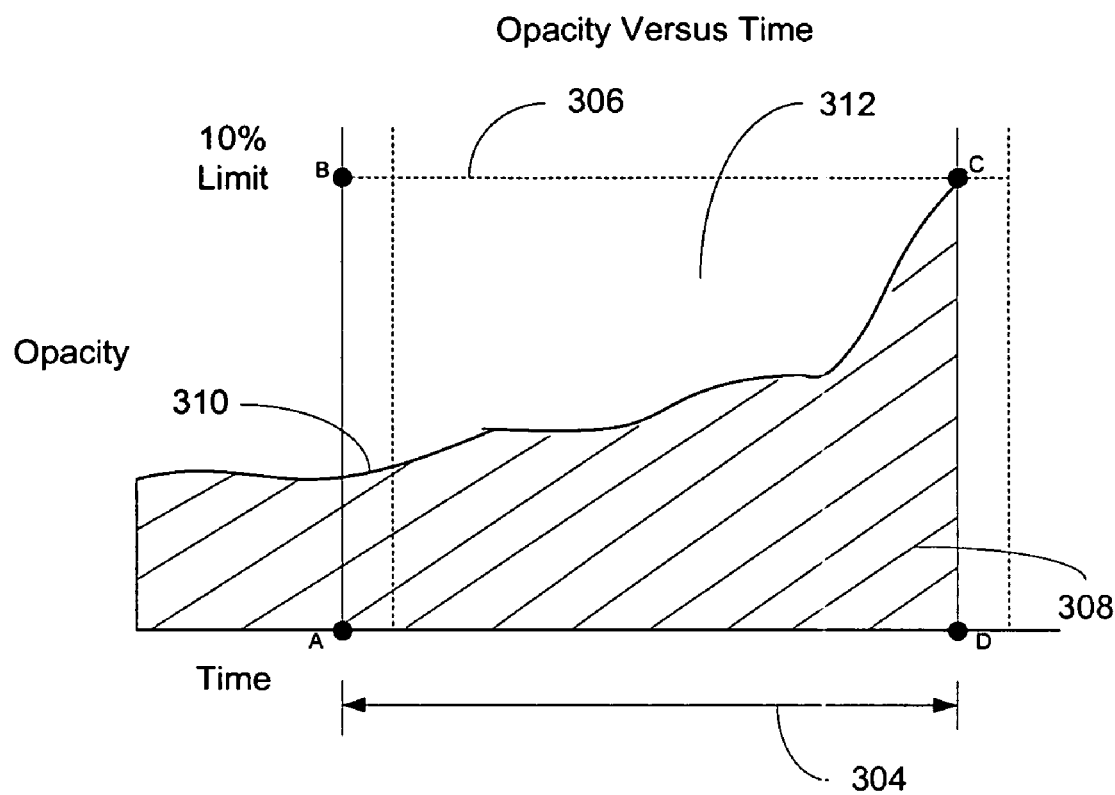
FIGS. 3(a) and 3(b) are graphs demonstrating the operation of an exemplary embodiment of the present application.

In the case where the maximum allowable average opacity is constant over the sliding window of time, the Maximum Capacity becomes a fixed value, which is represented graphically in FIG. 3(a) by the area of rectangle ABCD, wherein the length of the rectangle corresponds to the length of the sliding window of time 304 (in this case is 6 minutes) and the height corresponds to the maximum average opacity line 306 (in this case is 10% opacity). Note the 10% maximum opacity average and the 6 minute sliding window of time are exemplary only and are used herein because the values correspond to a current United State Federal Government regulation regarding what constitutes an opacity emission violation. As already described, other values for the maximum opacity average and the sliding window of time, such as those that reflect a state law, an in-house corporate policy, a change in the current federal regulations, etc. may be used with the exemplary embodiments described herein.

At a step 204, the process may determine a Used Capacity 308. As shown in FIG. 3(a), the Used Capacity 308 may be determined by calculating the area under a recorded opacity line 310, which may be created by plotting the recorded opacity measurements versus time (i.e., plotting each of the recorded opacity measurement, which, as stated, may be taken at a rate of one per second). Used Capacity 308, i.e., the area under the recorded opacity line 310, further may be calculated by determining an average opacity measurement for all of the opacity measurements over the sliding window of time 304. Those skilled in the art will appreciate that other methods may be used to calculate Used Capacity. In regard to the operation of the sliding window of time 304, the window 304 may "move forward" such that each newly recorded opacity measurement is included within the window. As a new measurement is included in the sliding window of time 304, an opacity measurement at the back end of the window necessarily will fall outside of the sliding window of time.

At a step 206, the process may determine an Available Capacity 312. The Available Capacity 312 may be determined by calculating the differential between Used Capacity 308 and the Maximum Capacity. Accordingly, the Available Capacity 312 may be determined by subtracting Used Capacity 308 from the Maximum Capacity. A positive result to this calculation may demonstrate that there is capacity available to the emitter before a violation occurs. On the other hand, a negative result may indicate that a violation already has occurred.

From step 206, the process may proceed to both a step 208 and a step 210. At step 208, the Available Capacity 312 may be compared to one or more predetermined warning levels to determine if the Available Capacity 312 is at a level that indicates a violation is close to occurring. The predetermined warning levels may include an alert level 314 and a danger level 316. The alert level 314 may provide a preliminary warning that a violation is close to occurring. The alert level 314 may be configurable so that it may be set to account for specific plant performance or operator preferences. In some embodiments, the alert level 314 may be set such that it indicates that the Available Capacity 312 is less than about 7-10% of the Maximum Capacity. The danger level 316 may be set below the level of the alert level 316 to provide a warning that a violation is imminent or close to occurring. The danger level 316 may be configurable so that it may be set to account for specific plant performance or operator preferences. In some embodiments, the danger level 316 may be set such that it indicates that the Available Capacity 312 is less than 2-5% of the Maximum Capacity.

Figure 3B:
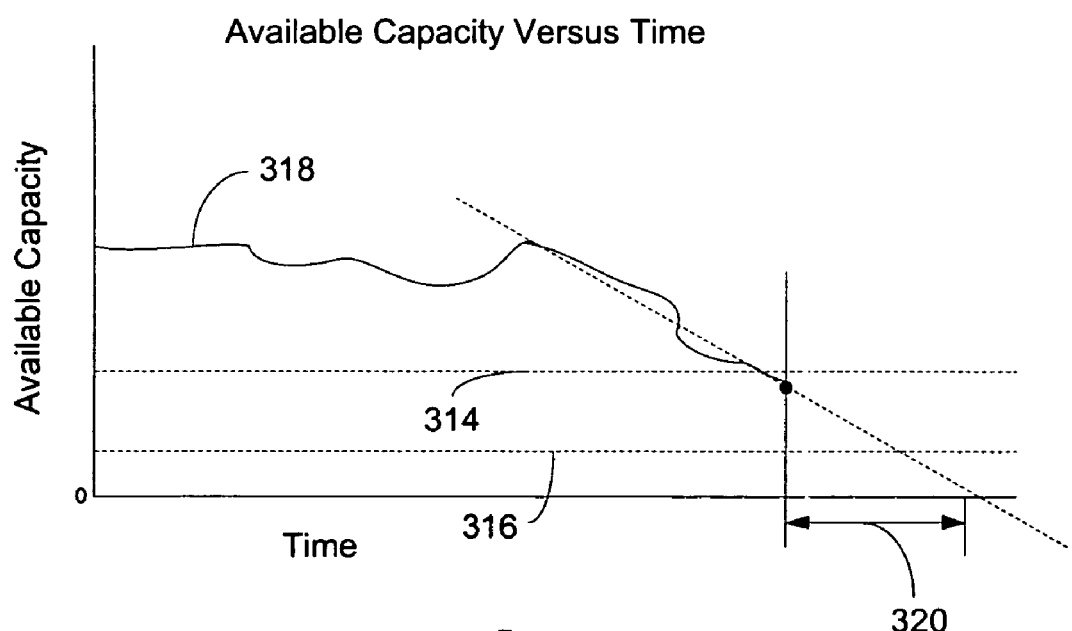

At a step 210, the process may analyze the present and recorded data concerning the Available Capacity 312 and/or may plot an Available Capacity Versus Time graph, of which an exemplary plot may be seen in FIG. 3(b). As shown, the calculated Available Capacity 312 may be plotted versus time such that an available capacity line 318 is created. As shown on FIG. 3(b), the alert level 314 and danger level 316 also may be indicated on this graph.

At a step 212, the present and recorded data concerning the Available Capacity 312 and/or the Available Capacity Versus Time graph then may be used to determine a predicted time to violation 320. In general, this may be accomplished by trending the data over time to determine a predicted time at which point the Available Capacity will have a value of 0 (i.e., when the available capacity line 318 intersects the x-coordinate). For example, linear extrapolation may be used to determine the predicted time to violation 320. More specifically and as used in FIG. 3(b), a least squares linear extrapolation based on the last five opacity measurements may be used to determine the predicted time to violation 320. Note that, as one of ordinary skill in the art would appreciate, the exemplary embodiments described herein may be used to predict future emissions for the emitter without determining a time to violation.

At a step 214, the process may compare the predicted time to violation 320 to one or more predetermined time to violation warning levels to determine if a violation is imminent or close to occurring. The one or more predetermined time to violation warning levels may be configurable so that they may be set to account for specific plant performance or operator preferences.

At a step 216, the information from step 208 (i.e., the comparison of the current level of the Available Capacity 312 to predetermined warning levels) and step 214 (i.e., the comparison of predicted time to violation 320 to predetermined time to violation warning levels) may be processed and an event may be generated based on certain criteria. An event may constitute a warning to the system operator concerning the likelihood of a forthcoming opacity emission violation. The criteria for event generation may be formatted to satisfy the specific needs of a particular emitter and the desires of the system or plant operator.

In one embodiment of the current application, the process may generate events based on a scale of increasing severity, i.e., increasing likelihood of an opacity emission violation. For example, the process may generate a Severity 1 Event when the predicted time to violation 320 is less than 120 seconds. The process may generate a Severity 2 Event when the predicted time to violation 320 is less than 90 seconds. The process may generate a Severity 3 Event when the predicted time to violation 320 is less than 60 seconds and/or the Available Capacity 312 is determined to be less than the alert level 314 (i.e., less than about 7-10% of the Maximum Capacity). The process may generate a Severity 4 Event when the predicted time to violation 320 is less than 30 seconds and/or the Available Capacity 312 is determined to be less than the danger level 316 (i.e., less than about 2-5% of the Maximum Capacity). The criteria for the event generation may be fully configurable to satisfy specific conditions of the emitter.

As part of a generated event, the process may send notifications to the appropriate persons, which may include the system operator, plant manager, and/or operations manager. Such notifications may be sent via email, computer "pop-up" notification, cell phone, pager, alarm system, etc. Further, as part of a generated event, the process may recommend certain actions to take to avoid the violation. Recommended actions may include the isolation of leaky baghouse filters, releasing from isolation properly functioning baghouse filter chambers, and other similar recommendations. The system operator or plant manager may configure recommended actions to include actions specific to the particular plant. Further, in certain embodiments, as part of a generated event, the system operator or plant manager may configure the operating system such that recommended actions happen automatically upon the generation of an event.

Configurable rules sets such as those described herein may be included in computerized operating systems that are used to operate and manage plants such as fossil fuel fired power plants, cement plants and similar facilities. Such computerized operating systems may include System 1® or other similar commercially available operating systems. The exemplary embodiments described herein also may be used in predicting violations of other types of emissions where violations are determined in a similar manner, such as, but not limited to, $NO_x$, $SO_x$, or mercury emissions.

It should be apparent that the foregoing relates only to the described embodiments of the present application and that numerous changes and modifications may be made herein without departing from the spirit and scope of the application as defined by the following claims and the equivalents thereof.

I claim:

1. A method of predicting opacity emissions, comprising the steps of:
   determining a first capacity for opacity emissions during a sliding window of time;
   determining a used capacity for opacity emissions during the sliding window of time; and
   determining an available capacity for opacity emissions by calculating the differential between the first capacity and the used capacity;
   wherein the opacity emissions are determined at a fossil fuel fired power plant and the predicting opacity emissions includes predicting opacity emission violations;
   wherein the first capacity comprises the average opacity level available to the fossil fuel fired power plant over the sliding window of time before the opacity emission violation occurs; and
   wherein the opacity emission violations comprise a condition where the opacity emissions of an emitter during the sliding window of time exceed a desired level.

2. The method of predicting opacity emissions according to claim 1, wherein the step of determining a used capacity for opacity emissions during the sliding window of time comprises taking periodic opacity measurements of the opacity emissions by an opacity sensor.

3. The method of predicting opacity emissions according to claim 2, wherein the opacity measurements are taken at the rate of approximately one every second.

4. The method of predicting opacity emissions according to claim 2, wherein the used capacity comprises an average of the opacity measurements taken during the sliding window of time.

5. A method of predicting opacity emissions comprising the steps of:
   determining a first capacity for opacity emissions during a sliding window of time;
   determining a used capacity for opacity emissions during the sliding window of time;
   determining an available capacity for opacity emissions by calculating the differential between the first capacity and the used capacity;
   recording the available capacity data;
   analyzing the recorded available capacity data over time; and
   determining, from the analysis of the recorded available capacity data, a predicted time to violation that indicates when the available capacity is predicted to equal about 0;
   wherein the opacity emissions are determined at a fossil fuel fired power plant.

6. The method of predicting opacity emissions according to claim 5, wherein the analyzing of the recorded available capacity data comprises least squares linear extrapolation where the least squares linear extrapolation is based on at least the last five samples of the available capacity data.

7. The method of predicting opacity emissions according to claim 5, wherein the analyzing of the recorded available capacity data comprises linear extrapolation.

8. The method of predicting opacity emissions according to claim 7, further comprising the step of comparing the available capacity to one or more predetermined warning levels to determine if the available capacity is at a level that indicates proximity to an opacity emission violation;
   wherein the opacity emission violation comprise a condition where the opacity emissions of an emitter during the sliding window of time exceed a desired level.

9. The method of predicting opacity emissions according to claim 8, further comprising the step of comparing the predicted time to violation to one or more predetermined time to violation warning levels to determine if the time to violation is at a level that indicates proximity to the opacity emission violation.

10. The method of predicting opacity emissions according to claim 9, further comprising the step of generating an event based on the comparison of the available capacity to one of predetermined warning levels and/or the comparison of predicted time to violation to predetermined time to violation warning criteria;
    wherein the event comprises a warning concerning the proximity to the opacity emission violation.

11. The method of predicting opacity emissions according to claim 10, wherein the step of generating an event occurs when at least one of the following conditions is satisfied:
    when the predicted time to violation is determined to be less than 120 seconds;
    when the predicted time to violation is determined to be less than 90 seconds;
    when the predicted time to violation is determined to be less than 60 seconds;
    when the available capacity is determined to be less than a first predetermined warning level, the first predetermined warning level indicating when the available capacity is less than about 7-10% of the first capacity;
    when the predicted time to violation is determined to be less than 30 seconds; and
    when the available capacity is determined to be less than a second predetermined warning level, the second predetermined warning level indicating when the available capacity is less than about 2-5% of the first capacity.

12. The method of predicting opacity emissions according to claim 10, wherein the step of generating an event further comprises sending notification of the event.

13. The method of predicting opacity emissions according to claim 12, wherein the step of generating an event further comprises sending notification of at least one recommended actions to avoid the opacity emission violation.

14. The method of predicting opacity emissions according to claim 13, wherein at least one of the recommended actions is taken automatically.

15. A system for predicting opacity emissions, comprising:
    means for determining a first capacity for opacity emissions during a sliding window of time;
    means for determining a used capacity for opacity emissions during the sliding window of time;

means for determining an available capacity for opacity emissions by calculating the differential between the first capacity and the used capacity;

means for recording the available capacity data;

means for analyzing the recorded available capacity data over time; and means for determining, from the analysis of the recorded available capacity data, a predicted time to an opacity emission level that indicates when the available capacity is predicted to equal about 0.

16. The system for predicting opacity emissions according to claim 15, wherein the means for determining the predicted time to an opacity emission level that indicates when the available capacity is predicted to equal about 0 comprises means for performing least squares linear extrapolation where the least squares linear extrapolation is based on at least the last five samples of the available capacity data.

17. The system for predicting opacity emissions according to claim 15, wherein the means for determining a used capacity for opacity emissions during a sliding window of time comprises an opacity sensor; and wherein predicting opacity emissions includes predicting opacity emission violations, wherein the opacity emission violations comprise a condition where the opacity emissions of an emitter during the sliding window of time exceed a desired level.

18. The system for predicting opacity emissions according to claim 17, wherein:

the first capacity comprises the average opacity level available to the emitter over the sliding window of time before the opacity emission violation occurs; and the used capacity comprises an average of periodic opacity measurements taken by the opacity sensor during the sliding window of time.

* * * * *